Aug. 11, 1936.  D. B. HYDE  2,050,436

EMERGENCY ILLUMINATING KIT

Filed April 25, 1934

Inventor,
Donald B. Hyde
by Heard Smith & Tennant.
Attys.

Patented Aug. 11, 1936

2,050,436

UNITED STATES PATENT OFFICE 2,050,436

EMERGENCY ILLUMINATING KIT

Donald B. Hyde, Framingham Center, Mass.

Application April 25, 1934, Serial No. 722,309

3 Claims. (Cl. 240—52)

This invention relates to pyrotechnical emergency illuminating apparatus for vehicles and has for its general object to provide an emergency lighting means which is readily stored in a small space and is protected from mechanical injury and from the injurious effects of moisture and the accumulation of foreign matter thereupon, thereby insuring that the illuminant will always be available and in perfect operating condition.

A further and more particular object of the invention is to provide an efficient compact means for connecting the fusee, or other pyrotechnical illuminant, to a vehicle for a support while the illuminant burns.

A further object of the invention is to provide a compact sealed container to enclose a fusee, or other pyrotechnical illuminant, together with means for securing the fusee to a vehicle, whereby unauthorized tampering with or removing the fusee, or its connecting member, from the container, is rendered plainly apparent.

A further object of the invention is to provide means, for securing the fusee upon the vehicle, which is compact, rigid, and inexpensive to produce.

These and other objects and features of the invention will more fully appear from the following description and the accompanying drawing, and will be particularly pointed out in the claims.

Figure 1:
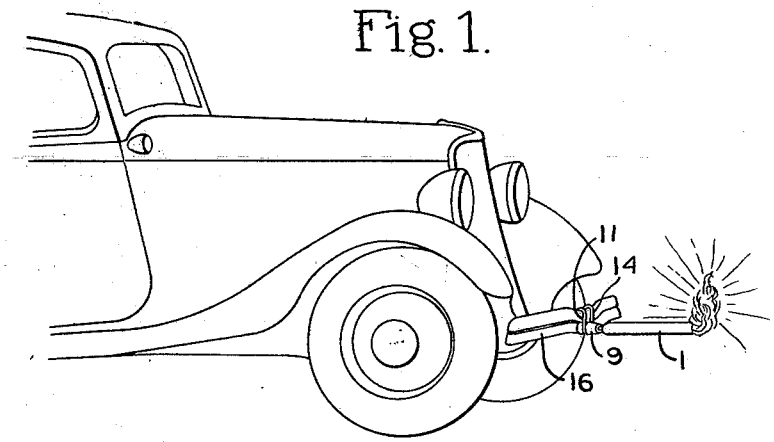
Fig. 1 is a general view of the invention shown in operating position upon a vehicle.
Figure 2:
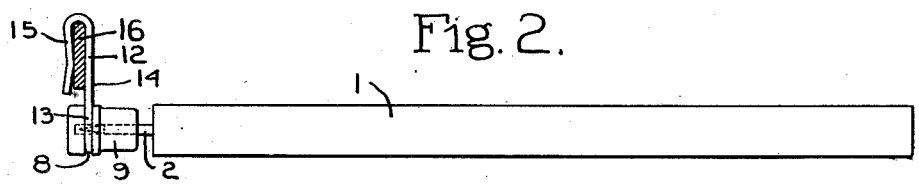
Fig. 2 is a general view of the apparatus illustrating the manner in which the illuminant is secured to the vehicle.
Figure 3:
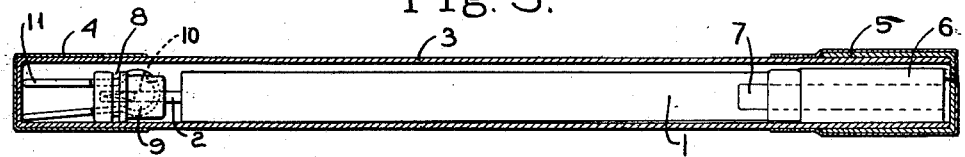
Fig. 3 is a longitudinal cross sectional view of the protective container with its contents therein.
Figure 4:
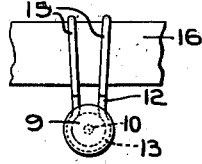
Fig. 4 is an end view of the elements shown in Fig. 2.

Under present-day driving conditions, with dense volume of traffic and high speed driving, it becomes highly dangerous to stop a vehicle along the side of a road. Under normal visibility other drivers proceeding along the road at night are quite often blinded by the headlights of approaching vehicles, or their eyes become fatigued after driving long distances against approaching traffic. Under such conditions the driver's visibility along the sides of the road is at a minimum and the chances of collision by a passing car with a parked car are apparent. When normal visibility at night is further reduced by hazy or foggy conditions the danger of collision is multiplied many times.

When an emergency arises and it becomes necessary to stop the vehicle at the side of the road, the safety of the vehicle and its occupants must be protected from all possibility of collision with passing vehicles. The present invention supplies the means for insuring safety by providing a brilliant illuminant, of white or colored light, to warn others of the presence of the vehicle at the side of the road. The present invention not only provides the means for utilizing the illuminant, but also insures that it will always be available in an emergency and also that it will always be in operative condition.

The illuminant 1 desirably is a fusee or other pyrotechnical illuminating device. A fusee of the type used by railroads is shown herein which may be designed to burn for a fifteen-minute period, or for whatever period it is deemed necessary. The usual form of railroad fusee shown herein is provided with a sharpened spike 2 which projects from the base thereof and is adapted to be driven into a convenient support, such as a railroad tie, or the fusee may be driven directly into the roadbed.

The present invention is designed to provide a pyrotechnical emergency kit for use with automobiles, and particularly for buses, trucks, and the like, of public utilities which are driven over paved highways. The paved highways are so hard that it is impractical, if not impossible, to drive the spike of the usual form of railroad fusee into them, or to support the fusee in a position to illuminate the end or side of the vehicle toward the center of the road, or to provide light to enable tires to be changed or repairs to be made. The present invention contemplates the provision of means for supporting a suitable fusee upon the front or rear bumper of the machine, or both, in such manner as to warn approaching vehicles of the standing automobile, as well as to provide sufficient light to enable the repairs conveniently to be made.

The emergency kit comprises a cylindrical container or carton of moisture-proof material having an internal diameter slightly greater than the diameter of the fusee and of sufficient length to contain a suitable supporting bracket for hanging the container upon the bumper of the machine. The container is permanently closed at one end and sealed tightly by means of a paper cap 4. The other end of the container is closed, preferably by a telescoping cover 5, which is placed over the open end of the container and is tightly sealed by means of a paper cap, or any other suitable means. The container is slightly larger in interior diameter than the fusee and somewhat longer to provide space at one end thereof to receive a device for connecting the fusee to the vehicle which acts to support it in operating position thereon and which will be hereinafter described. This connecting device is very compact and requires little space for storage. The assembled container, and contents, is therefore very compact.

Many of the pleasure vehicles of the present day provide limited space for storage. The tool storage compartment is practically the only storage space and this space is usually quite small. The compactness of the illuminating apparatus above described is therefore of vital importance since one or several of these units may readily be stored away in the tool compartment or in some other limited space. When so stored away the fusee is completely protected by the casing.

There are certain States which require the operators of trucks to have at least one emergency light upon the vehicle at all times. It has been found good practice, especially on trucks, to provide a convenient rack to hold one or more of the fusees in a position which is readily available to the driver at a moment's notice. The present invention is ideally adapted for such installations. The protected fusee will remain in perfect operating condition for an indefinite period of time, and is guarded against all ordinary mechanical injury.

The fusee 1 desirably is of usual construction having a telescoping cover 6 to close its outer end. The cover is secured in position by a sealed paper cap which is removed by manipulating a tear strip 7. The usual or any suitable means (not shown) are provided for igniting the fusee. The inner end of the fusee is provided with a groove 8 within which is received a support or connecting member, to be hereinafter described. The groove 8 may be formed directly in the base member or plug at the lower end of the fusee, or in the end of the fusee tubing. As shown herein, the groove 8 is formed in the periphery of a supplemental base member or sleeve 9 of wood, or other suitable material, whose axial aperture 10 fits snugly over the spike 2 in the end of the fusee.

The natural and most effective way of utilizing the fusee as a protecting device is to place it directly upon the vehicle. Particularly is this fact true if the lighting system of the vehicle has entirely failed. Under such conditions the fusee may be secured upon the front or rear bumper of the vehicle, thus providing means for safely reaching a garage, or some other situation where repairs can be made.

In order to secure the fusee to a bumper of the vehicle a special bracket 11 is provided by means of which the vehicle itself is utilized to support the fusee while it is burning. A desirable form of bracket is shown in Figs. 1, 2, 3, and 4. A section of stiff resilient wire 12 is bent at its central portion to form a U-shaped loop presenting a circular socket 13 which is adapted to receive and detachably to engage the groove 8 upon the sleeve 9. Desirably the upper end of the loop is contracted above the socket portion so that its width is less than the diameter of the groove in the sleeve. The sleeve may therefore be snapped into position and firmly embraced by the loop. The ends of the loop are extended upwardly in substantially parallel relation to form a stiff body portion 14. Each of the ends 15 of the body portion is reversely bent backward upon the body, is spaced therefrom and lies substantially parallel thereto. The reversely bent ends 15 form a hook portion which is adapted to be hooked upon a front bumper 16, a rear bumper, or any other convenient projecting part of the vehicle.

The plane of the loop 13 when supported by its hook desirably is approximately vertical thereby causing the fusee to be supported from the vehicle in a substantially horizontal position. The plane of the loop, however, may be angled slightly upwardly, but desirably the bracket should be constructed to occupy as little space as possible, so that it may be readily packed away in the container 3.

Figure 5:
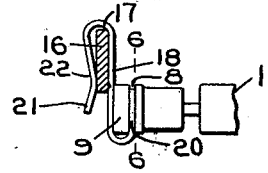
Figs. 5 and 6 illustrate a different embodiment of the connecting member used to secure the illuminant to the vehicle, Fig. 6 being a cross sectional view on line 6—6 Fig. 5.
Figure 6:
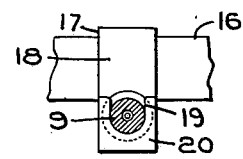

Another form of the bracket is shown in Figs. 5 and 6. This bracket 17 is constructed of a flat metallic strip having a straight vertical body portion 18. The lower end of the body 18 is reversely bent into U-shaped form. A U-shaped socket 19 is formed in the outer leg 20 of the U-shaped end to fit the groove 8 in the sleeve 9, thereby acting to hold the fusee 1 in position substantially at right angles to the plane of the body portion 18 of the connection 17. The upper end of the body portion 18 is bent backwardly in a reverse direction from that of the lower end. This reversely bent portion 21 desirably is spaced a short distance from the body portion and lies substantially parallel thereto. The central portion 22 thereof may if desired be curved slightly inwardly to contact firmly with the bumper 16, or other part of the vehicle upon which the connecting member is fastened.

Figures 7, 8:
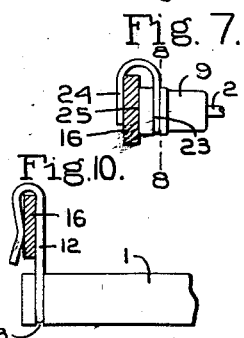
Figs. 7 and 8 illustrate another embodiment of the invention, Fig. 8 being a cross sectional view on line 8—8 Fig. 7; and, Fig. 9 illustrates a further modification of the invention.
Figure 10:
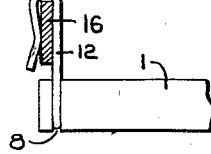
Fig. 10 is a partial view illustrating a different embodiment of the elements shown in Fig. 2.

A further modification of the connecting member is illustrated in Figs. 7 and 8. In this form of the device a section of wire is bent at its central portion to form a loop or socket 23 which is adapted to fit the groove in the sleeve 9. The upper ends of the loop 23 are bent backwardly from the plane of the loop 23 to form a pair of substantially parallel legs 24 which act as hooks when placed upon the bumper 16 to retain the sleeve 9 with its attached fusee in operative position with the outer end 25 of the sleeve engaging the bumper.

Figure 9:
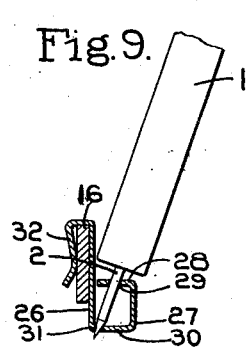

A further modification of the device is shown in Fig. 9. In this form of the device a flat strip of metal 26 is bent into a closed loop 27 preferably having square corners, the upper portion 28 of which is provided with an aperture 29 and the lower portion 30 of which is provided with an aperture 31. The aperture 29 is sufficiently large to receive the shank of the spike 2 of the fusee, while the aperture 31 is somewhat smaller and adapted to receive the point of the spike. The two apertures are so alined that when the fusee 1 is placed therein it will assume an angular position with respect to the vertical. The upper end of the strip 26 is reversely bent to form a hook 32 which is adapted to be placed upon the bumper 16, or other projecting part of the vehicle.

It will be understood that the particular embodiment of the invention disclosed herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. A pyrotechnical emergency device for use with an automobile having a bumper comprising a fusee having a spike projecting from the base thereof, a supplemental base member detachably mounted on said spike provided with a peripheral groove near its lower end and a metal bracket having an upper hook-shaped end to engage over the bumper of the automobile and a U-shaped socket to receive and detachably to engage the groove in said base member.

2. A pyrotechnical emergency device for use with an automobile having a bumper comprising a fusee having a spike extending axially from the base thereof, a supplemental base member mounted on said spike provided with a peripheral groove near its lower end and a bracket having an upper hook-shaped end to engage over the bumper of the automobile and at its opposite end a U-shaped socket to receive and detachably to engage the groove in said supplemental base member.

3. A pyrotechnical emergency kit for use with an automobile having a bumper comprising a fusee having a spike projecting from the base thereof, a supplemental base member mounted on said spike provided with a peripheral groove near its lower end and a bracket comprising a stiff resilient wire bent at its central portion to present a U-shaped circular socket to fit the groove in said supplemental base member, and having leg portions extending upwardly therefrom more narrowly spaced apart than the diameter of the circular socket, whereby the fusee may be snapped into position within the socket and held firmly therein, the upper end of said leg portions being bent to provide substantially parallel hooks to engage over the bumper of the automobile.

DONALD B. HYDE.